March 21, 1961 A. W. HEDGREN 2,975,559
WIRE DISTRIBUTING CELLULAR METAL FLOOR
Filed Feb. 12, 1957 2 Sheets-Sheet 1
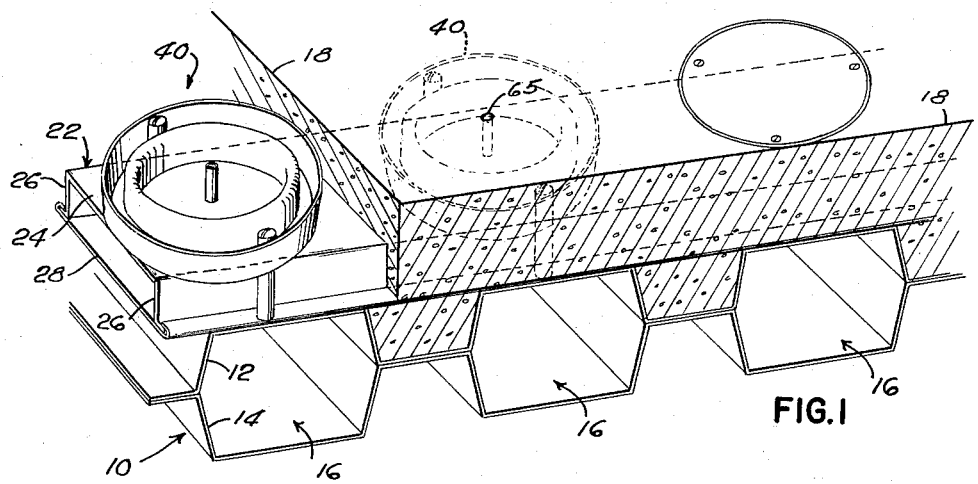
FIG.1
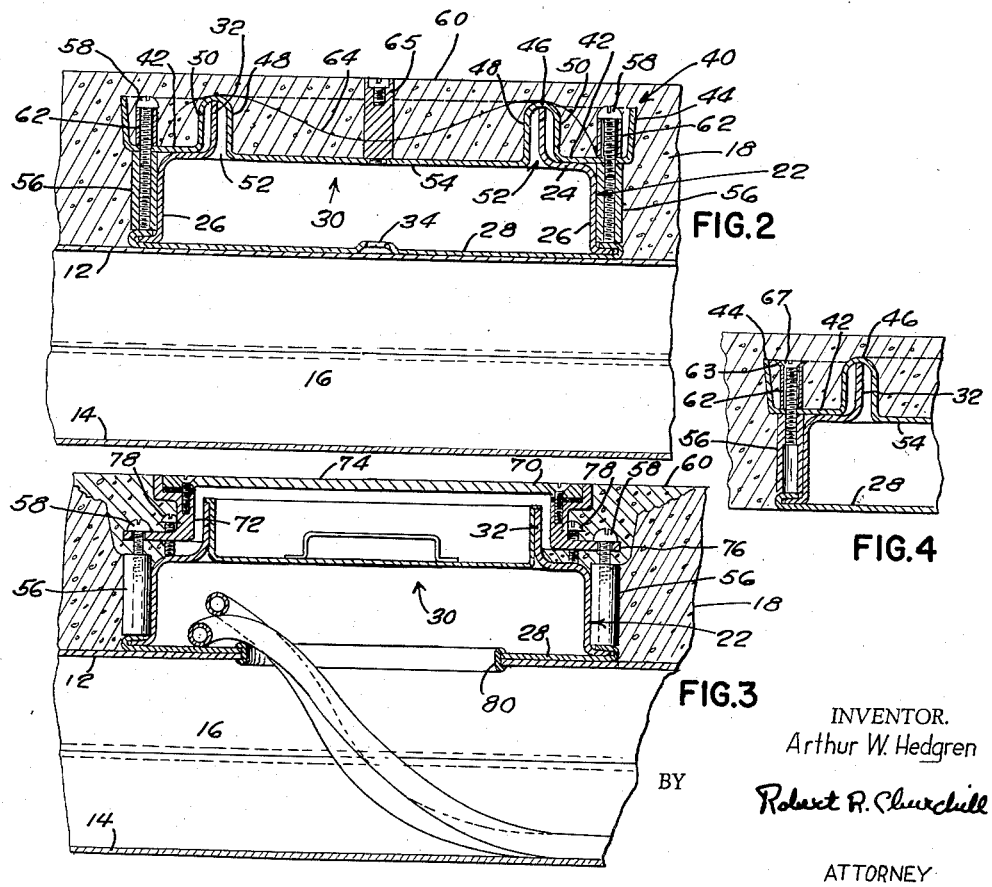
FIG.2
FIG.4
FIG.3
INVENTOR.
Arthur W. Hedgren
BY
Robert R. Churchill
ATTORNEY March 21, 1961     A. W. HEDGREN     2,975,559
WIRE DISTRIBUTING CELLULAR METAL FLOOR
Filed Feb. 12, 1957     2 Sheets-Sheet 2

INVENTOR.
Arthur W. Hedgren.

BY Robert R. Churchill

ATTORNEY

United States Patent Office 2,975,559
Patented Mar. 21, 1961

2,975,559

WIRE DISTRIBUTING CELLULAR METAL FLOOR

Arthur William Hedgren, Pittsburgh, Pa., assignor to H. H. Robertson Company, Pittsburgh, Pa., a corporation of Pennsylvania Filed Feb. 12, 1957, Ser. No. 639,739

3 Claims. (Cl. 50—70)

This invention relates to a wire distributing cellular metal floor.

The invention has for an object to provide a novel and improved wire distributing cellular metal floor for use in the construction of a building which is characterized by novel structure whereby economies may be effected in the manufacture and initial installation of the floor, and which may be readily made available for expansion of the electrical service as subsequently required, in a simple and efficient manner.

With this general object in view and such others as may hereinafter appear, the invention consists in the wire distributing cellular metal floor and in the various structures, arrangements and combinations of parts hereinafter described and particularly defined in the claims at the end of this specification.

In the drawings illustrating the preferred embodiment of the invention:

Fig. 1 is a perspective view of a wire distributing cellular metal floor embodying the present invention;

Fig. 2 is a cross sectional view of a concealed access opening provided with a cover member at an initially unused junction point and covered by a floor fill;

Fig. 3 is a cross sectional view of a junction unit installed in operative relation to the access opening after the floor fill has been broken away and the cover member shown in Fig. 2 has been removed;

Fig. 4 is a partial cross section similar to Fig. 2 showing a modified form of the invention.

Figure 5:
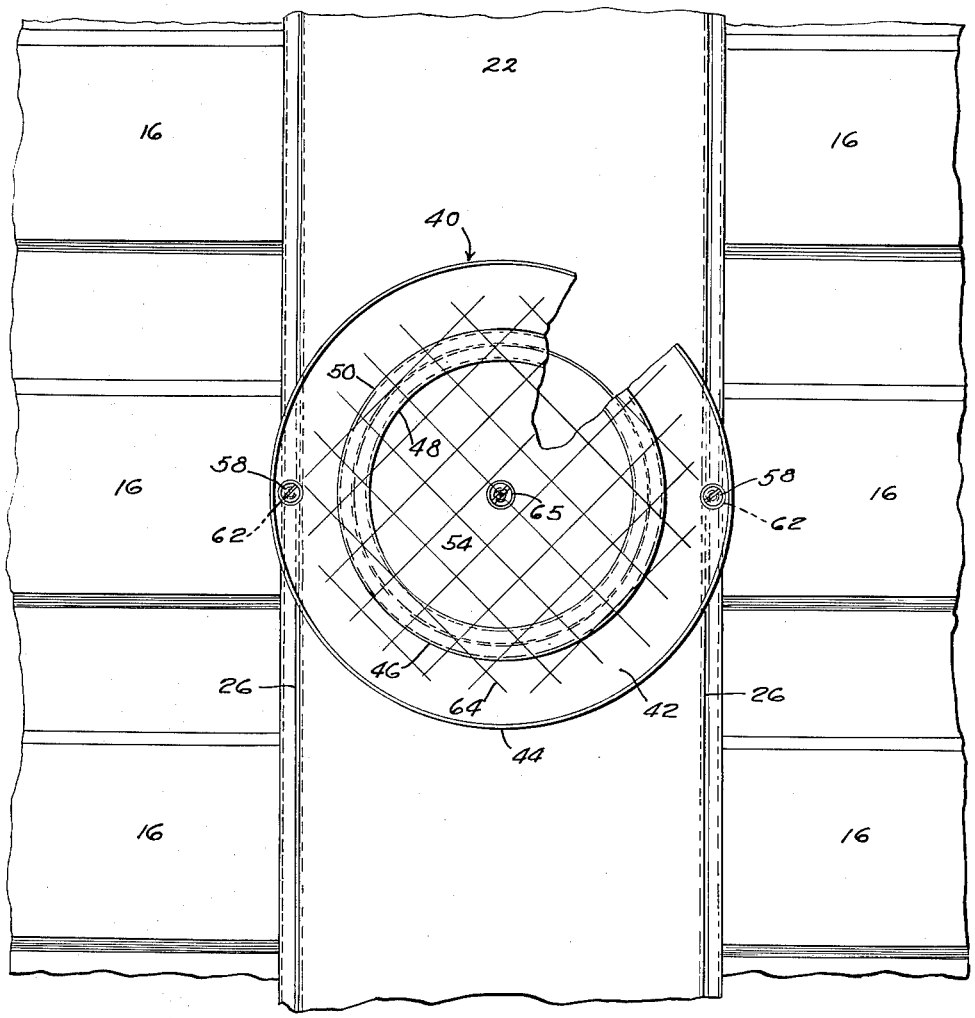
Fig. 5 is a plan view of the structure shown in Fig. 2 before being covered over by the floor fill.

In general the present invention relates to an improvement in a wire distributing metal flooring system, such as is disclosed in the United States patent to Young et al., No. 2,125,366. Such systems embody a multicellular metal flooring through which wires may be drawn to provide electrical service to different parts of the building. The wires are fed to the different cells by a crossover duct mounted to extend transversely of and preferably along the top of the multicellular flooring and through which the feed wires may be extended. The crossover ducts are provided with junction units at selected intersecting points of the duct with the cells thus providing access openings to permit electrical service to be furnished to selected of the flooring cells.

In practice a different crossover duct is preferably used for each type of electrical service provided. For example, low tension lines may be provided in one crossover duct and high tension lines in a second duct, and different flooring cells are preferably used for distributing the wires from each crossover duct. Thus, when two crossover ducts are used it has been the practice in such prior wire distributing systems to provide a complete junction unit at alternate intersecting cells, the junction units of one crossover duct being staggered relative to the other so that each and every cell in the flooring is immediately available for wire distribution.

In actual practice only a very small percentage of such available and immediately usable cells are actually used in an initial installation, and those not used are covered over by the floor covering. Although the above described system is of advantage in that each cell is immediately available for wiring purposes, it will be apparent that the provision of a complete junction unit at each intersection of the crossover duct with an underlying wire distributing cell in such prior systems involves a great deal of unnecssary time, labor and expense in the initial installation, especially when it is considered that a majority of the cells may never be used.

In accordance with the present invention the crossover ducts are provided with complete junction units at those cell intersections only which are to be immediately used, the intersections at the remaining cells being provided with concealed access openings which may be initially provided with a cover member and completely covered over with the floor fill, but which may be opened up when subsequently required and provided with a permanent access or junction unit. Thus, in those installations in which all of the cells are not made immediately available for use the present wire distributing apparatus effects substantial economies in manufacturing costs and material, and also in the time and labor involved in the initial installation.

The present invention provides a relatively inexpensive one-piece cover member for an initially unused concealed access opening, generally cup-shaped and formed to fit over and around the access opening, and detachably secured to the crossover duct. The upper portions of the cover member and the securing means are disposed a relatively short distance below the upper surface or screed line of the subsequently poured floor fill so that such concealed access opening may be easily and quickly made ready for use when subsequently required by merely removing the relatively thin layer of fill above the uppermost portions of the cover member, thus providing access to the securing means and permitting easy removal of the cup-shaped cover member, leaving a clean space about the access opening adapted to receive a permanent junction unit which may be fastened to the crossover duct in operative relation to the access opening by the same securing elements used to fasten the cover member.

Referring now to the drawings, 10 represents one type of cellular metal flooring used in the erection of buildings and which, as herein shown, comprises a plurality of units formed by assembling and welding together an upper corrugated sheet 12 and a lower corrugated sheet 14 to form in effect a series of closely spaced parallel hollow beams or cells 16 upon the top of which a concrete fill 18 is poured as illustrated in Fig. 1. In practice it is preferred to manufacture the cellular metal floor in units of varying lengths according to the steel fabrication of the building in which the floor is to be incorporated, and during the erection of the floor the units are laid end to end so that the cells of one unit cooperate with and form extensions of the cells of a second unit to provide a plurality of continuous conduits extending across the building and through which wiring for electrical service of various types may be drawn.

As illustrated in Fig. 1, the preferred form of crossover duct comprises an elongated hollow rectangular shaped conduit 22 having an upper section provided with a top wall 24 and depending side walls 26 having their edges bent outwardly, and having a lower section 28 comprising the lower wall having its longitudinal marginal edges turned upwardly and inwardly to embrace the outwardly bent edges of the side walls 26, the upper and lower sections being preferably welded together to form an integral unit. The top wall 24 of the crossover duct may be provided with spaced access openings 30 in alignment with all or selected of the underlying cells 16, preferably at the points of intersection of the cells with the crossover duct, each opening being defined by an upstanding cylindrical wall or rim forming a tubular extension 32, and the lower wall 28 is provided with spaced pilots 34 in alignment with the access openings which are particularly adapted for the reception of a tool, such as a hole saw, to guide the tool when it is desired to complete an opening from the duct 22 into a cell positioned below.

As herein illustrated, the preferred form of cover member for protecting an initially unused access opening is indicated generally at 40 and may comprise a generally circular one-piece sheet metal member having an annular flange portion 42 arranged to rest on the top wall 24 of the duct 22, said flange being provided with an upstanding marginal or peripheral side wall 44. The cover member 40 is further provided with an upstanding circular ridge portion 46 defined by spaced inner and outer tubular wall portions 48, 50 joined at their upper ends to form a relatively deep annular groove 52 in the underside of the cover member which is arranged to receive the tubular extension 32 of the duct. The annular flange portion 42 is integral with the outer wall portion 50, and the inner wall portion 48 extended within the access opening is integral with a bottom wall 54 forming a cup-shaped central portion, with the bottom wall 54 disposed substantially in alignment with the top wall 24 of the duct.

As shown in Fig. 2, interiorly threaded elements 56 may be welded or otherwise secured to the side walls 26 of the duct adjacent the access opening, and screws 58 extended through openings in the flange portion 42 are threadedly engaged with the elements 56 to secure the cover member to the duct. In practice the cover member 40 is preferably of a height such that the topmost portions of the cover member including the top edge of the peripheral wall 44 and the top edge of the ridge portion 46 are disposed a relatively short distance below the screed line or upper surface 60 of the subsequently poured floor fill 18, and in order to dispose the heads of the screws 58 in a like position relative to the upper surface 60 each screw is provided with an elongated tubular sleeve or spacing member 62 interposed between the flange portion 42 and the underside of the screw head as shown. In order to assist in retaining the floor fill in place within the cover member 40 a relatively coarse wire mesh screen 64 may be placed within the depressed portions of the cover in the manner indicated in Fig. 2, the screen being preferably welded to the top of the ridge 46. A central marker 65 having its upper end flush with the screed line may be threadedly engaged with the bottom wall 54 to indicate the location of a concealed access opening.

In practice the initially unused access openings may be provided with the cover member 40, over which the floor fill is poured. Other of the access openings may be provided with an immediately available junction unit of the type shown in Fig. 3. When it is desired to make use of a concealed initially unused access opening the relatively thin layer of floor fill covering the topmost portions 44, 46 of the cover member 40 may be easily broken away to expose the elevated screw heads 58 whereupon the screws may be removed and the cover lifted out, leaving a clean annular space around the access opening into which a permanent junction unit, indicated generally at 70, may be placed in operative relation to the access opening and secured to the duct. It will be observed that the upstanding peripheral side wall 44 may and preferably will be upwardly and outwardly flared, as shown, to facilitate removal of the entire closure.

The junction unit 70 may and preferably will comprise a junction unit of the type disclosed in the Wiesmann Patent No. 2,445,197, issued July 13, 1948, and which includes an annular member 72 fitted around the tubular extension 32 and provided with a cover 74 arranged flush with the upper surface 60 of the floor fill. The annular member 72 is further provided with a flange portion 76 having one set of screws 78 adapted to adjust the height and level of the annular member relative to the duct 22, and a second set of screws which may comprise the screws 58 extended through openings in the flange 76 and threadedly engaged with the elements 56 for securing the junction unit to the duct. The unit may then be grouted in by a floor fill material as indicated in Fig. 3. The opening through the lower wall 28 and the top wall of the underlying cell 16 may then be completed by means of a hole saw using the pilot 34 as a guide, the cut opening being preferably provided with a grommet 80 as shown.

From the above description it will be observed that the present cover member for a concealed access opening is simple in construction, may be economically manufactured, and provides a structure which may be easily removed when it is desired to use the access opening by breaking through a relatively thin layer of floor fill. It will also be observed that the tubular sleeves 62 in addition to presenting the heads of the screws 58 in an elevated position to permit access thereto after the removal of a relatively thin layer of fill, also protect the threads of the screws from the floor fill initially poured over the cover unit. In a modified form of the invention illustrated in Fig. 4, the tubular sleeve 62 may be provided with a flared and countersunk upper portion 63 to accommodate a flat head screw 67 as shown.

While the topmost portions of the cover members are herein shown as being disposed a relatively short distance below the screed line, it may be of advantage with some types of floor fill to dispose such topmost portions substantially flush with the screed line.

While the preferred embodiment of the invention has been herein illustrated and described, it will be understood that the invention may be embodied in other forms within the scope of the following claims.

Having thus described the invention, what is claimed is:

1. In a wire distributing cellular metal floor of the character described, a crossover duct comprising an elongated hollow member provided with an access opening in the top wall thereof, and a cover member for an initially unused access opening to protect the latter from the subsequently poured floor fill, said cover member comprising a generally circular one-piece sheet metal member shaped to fit over said access opening and having a horizontal annular flange portion resting on the top wall of said duct, said flange portion having at its outer portion an upstanding marginal side wall providing an annular rim, and fastening means for detachably securing the cover member to the duct, the annular rim of said cover member being of a height and the upper end of said fastening means being extended such as to dispose the upper edge of the rim and the tops of said fastening means respectively a relatively short distance below the screed line of the subsequently applied floor fill enveloping the cover member and said fastening means whereby breaking of a relatively thin annular layer of fill above said annular rim and above the tops of the fastening means permits access to said securing means and removal of the entire cover member with its overlying floor fill providing a clear space for installation and grouting of a junction unit in operative relation to said access opening.

2. A cover member as defined in claim 1 wherein the securing means comprises a pair of screws extended through openings in said flange and threadedly engaged with elements secured to said duct, said screws being provided with elongated spacing members interposed between the flange and the heads of the screws to dispose said heads in an elevated position relative to the flange and adjacent the upper edge of the annular rim of the cover member.

3. In a wire distributing cellular metal floor of the character described, a crossover duct comprising an elongated hollow member provided with an access opening in the top wall thereof defined by an upstanding tubular extension from said top wall, a cover member for an initially unused access opening in said duct to protect the latter from the subsequently poured floor fill, said cover member comprising a generally circular one-piece sheet metal member having an upstanding tubular ridge portion defining a relatively deep annular clearance groove in the underside thereof for receiving said tubular extension free of engagement with the side walls of the groove and providing a central depressed cup-shaped portion extended within said access opening and an outer annular horizontal flange arranged to rest on said top wall, said flange having an upstanding marginal side wall providing an annular rim, and fastening means adjacent said annular rim for detachably securing the cover member to the duct comprising a pair of screws extended through openings in said horizontal flange and threadedly engaged with elements secured to said duct, said screws being provided with elongated spacing members interposed between the flange and the heads of the screws to dispose the heads in an elevated position relative to the flange and to protect the shank of the screws from the subsequently poured concrete fill, the annular rim of said cover member being of a height such as to dispose the upper edge thereof a relatively short distance below the screed line of the subsequently applied floor fill enveloping the cover member and said fastening means whereby breaking of the relatively thin annular layer of fill above the upper edge of said annular rim permits access to said screw heads and removal of the entire cover member together with its overlying floor fill providing a clear space for installation and grouting of a junction unit in operative relation to said access opening.

References Cited in the file of this patent

UNITED STATES PATENTS

| | | |
|---|---|---|
| 1,898,087 | Fullman | Feb. 21, 1933 |
| 1,945,707 | Sharp | Feb. 6, 1934 |
| 1,996,371 | Fullman | Apr. 2, 1935 |
| 2,130,399 | Rypinski | Sept. 20, 1938 |
| 2,154,036 | Doherty | Apr. 11, 1939 |
| 2,219,451 | McCormick | Oct. 29, 1940 |
| 2,271,798 | Lewin | Feb. 3, 1942 |
| 2,672,749 | Wiesmann | Mar. 23, 1954 |

FOREIGN PATENTS

| | | |
|---|---|---|
| 556,126 | France | Apr. 7, 1923 |